United States Patent
Catenacci et al.

(10) Patent No.: US 7,300,088 B1
(45) Date of Patent: Nov. 27, 2007

(54) COLLAPSIBLE VEHICLE STORAGE CONTAINER

(75) Inventors: Paolo L. Catenacci, Windsor (CA); Ghassan M. Dirani, Dearborn, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/615,245

(22) Filed: Dec. 22, 2006

(51) Int. Cl.
*B60R 7/04* (2006.01)

(52) U.S. Cl. ............... 296/37.15; 296/66; 296/65.05; 296/37.5; 296/37.14

(58) Field of Classification Search ............. 296/66, 296/65.058, 69, 63, 37.5, 37.15, 37.14, 65.05; 224/275, 542, 544, 549; 297/188.02, 188.09, 297/188.1
See application file for complete search history.

(56) References Cited

U.S. PATENT DOCUMENTS

| | | | |
|---|---|---|---|
| 1,179,445 A * | 4/1916 | Manning | 296/37.5 |
| 1,456,247 A * | 5/1923 | Miller | 224/542 |
| 1,488,418 A | 3/1924 | Walther | |
| 3,796,342 A | 3/1974 | Sanders et al. | |
| 4,798,304 A | 1/1989 | Rader | |
| 5,038,953 A | 8/1991 | Radar | |
| 5,902,009 A * | 5/1999 | Singh et al. | 297/188.1 |
| 5,947,542 A * | 9/1999 | Lux et al. | 296/65.03 |
| 5,957,521 A * | 9/1999 | Schlachter | 296/37.15 |
| 6,056,177 A | 5/2000 | Schneider | |
| 6,161,896 A * | 12/2000 | Johnson et al. | 297/188.1 |
| 6,488,327 B1* | 12/2002 | Pearse et al. | 296/65.05 |
| 6,644,523 B1* | 11/2003 | Salas | 224/275 |
| 6,644,710 B2 | 11/2003 | Seel et al. | |
| 6,837,531 B2* | 1/2005 | Mack et al. | 296/65.09 |
| 6,877,807 B2* | 4/2005 | Mizuno et al. | 297/188.1 |
| 7,121,606 B2* | 10/2006 | Khan et al. | 296/37.15 |
| 2001/0020631 A1* | 9/2001 | Spykerman et al. | 224/539 |
| 2002/0005649 A1* | 1/2002 | Hofmann et al. | 296/37.15 |
| 2003/0047957 A1* | 3/2003 | Bargiel | 296/65.05 |
| 2004/0149791 A1* | 8/2004 | Tuel et al. | 224/275 |
| 2004/0245797 A1* | 12/2004 | Bixby | 296/37.15 |

\* cited by examiner

*Primary Examiner*—Jason S Morrow
(74) *Attorney, Agent, or Firm*—Ralph E. Smith

(57) ABSTRACT

A collapsible storage container is provided for a vehicle, wherein the vehicle includes a floor and a seat assembly having a seat back frame pivotally coupled to a seat bottom frame. The seat assembly is capable of being pivoted between a deployed position where the seat bottom frame is substantially perpendicular to the seat back frame and a stowed position wherein the seat bottom frame is substantially parallel to the seat back frame. A collapsible storage container having an attachment mechanism is provided which is capable of being moved from a collapsed position to an operative position. The floor includes a receiving mechanism located beneath the seat bottom frame in its deployed position arranged to removably secure the container to the floor.

8 Claims, 4 Drawing Sheets

COLLAPSIBLE VEHICLE STORAGE CONTAINER

FIELD OF THE INVENTION

The present invention relates to the use of storage containers in motor vehicles, and specifically to a collapsible storage container that can be collapsed when not in use.

BACKGROUND OF THE INVENTION

The concept of collapsible storage containers for use in a motor vehicle is generally known in the prior art. For example, U.S. Pat. No. 6,644,710 to Seel et al. discloses a motor vehicle having a collapsible box container contained in a recess located in the floor of the vehicle. Similarly, U.S. Pat. No. 6,056,177 to Schneider discloses a collapsible storage container having a floor panel, as well as front, back, partition and side walls capable of folding flat against the floor panel when the container is not in use. Such container can be used to store items within the vehicle in the absence of appropriate storage space in the vehicle.

However, one drawback of such assemblies is that many of these containers are bulky and require a substantial amount of space within the vehicle when not in use. Accordingly, further improvement to use and the ability to store the container is desired.

SUMMARY OF THE INVENTION

Accordingly, one aspect of the present invention is to provide a vehicle having a storage container that is capable of being folded flat beneath a passenger seat when not in use.

Another aspect of the present invention is to provide a vehicle having storage container that is capable of being removed from the vehicle to transport items, but capable of being secured within the vehicle.

In accordance with the foregoing aspects of the invention, a vehicle is provided, the vehicle having a floor and a seat assembly including a seat back frame pivotally coupled to a seat bottom frame. The seat assembly is capable of being pivoted between a deployed position where the seat bottom frame is substantially perpendicular to the seat back frame and a stowed position wherein the seat bottom frame is substantially parallel to the seat back frame. A collapsible storage container having an attachment mechanism is provided which is capable of being moved from a collapsed position to an operative position. The floor includes a receiving mechanism located beneath the seat bottom frame in its deployed position arranged to removably secure the container to the floor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
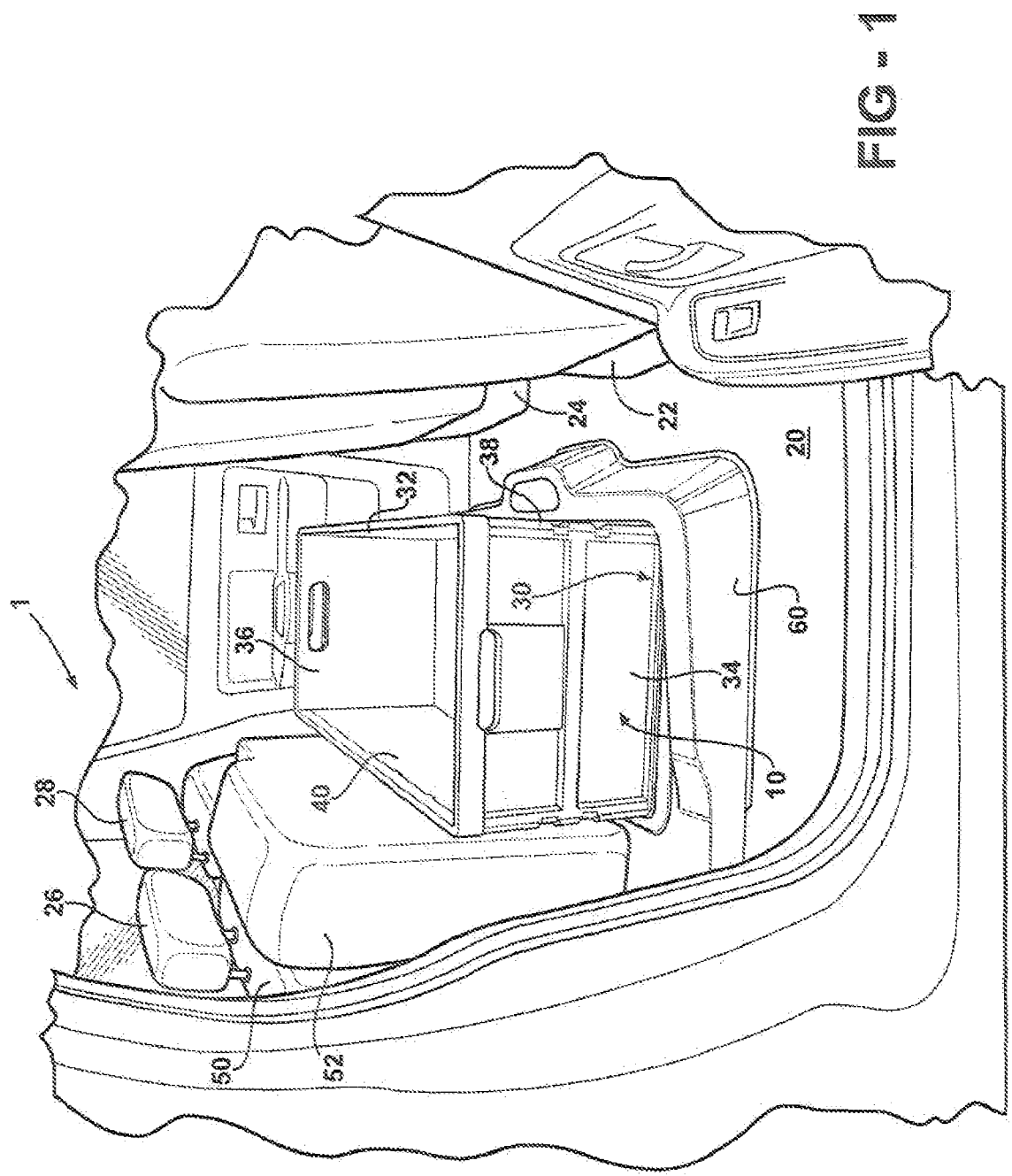
FIG. 1 is a perspective view of a vehicle having a collapsible storage container according to an exemplary embodiment of the present invention.
Figure 2:
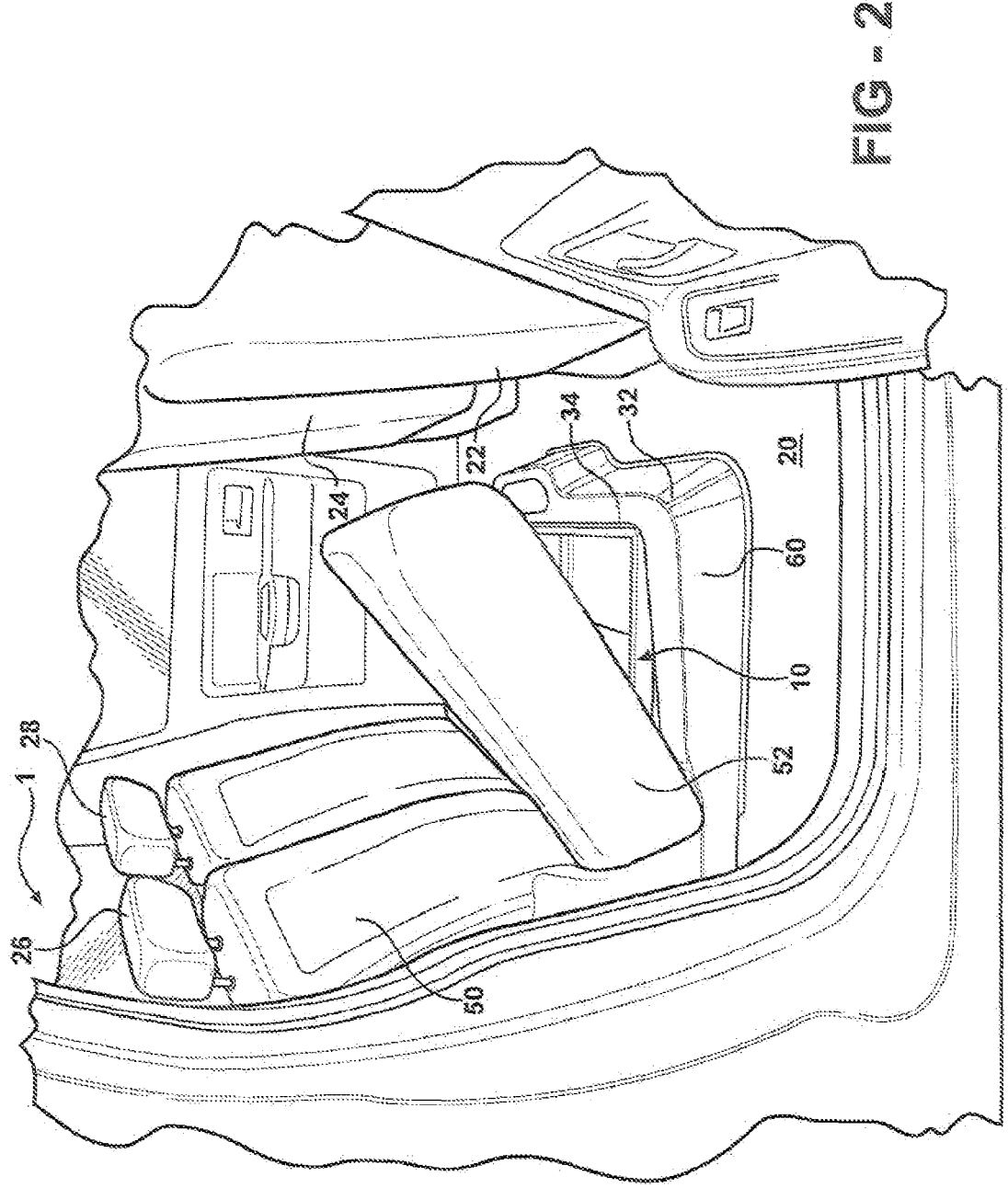
FIG. 2 is a perspective view of a vehicle having a collapsible storage container according to an exemplary embodiment of the present invention.

FIGS. 1 and 2 show a vehicle 1 having a collapsible storage container 10 according to an exemplary embodiment of the present invention. The vehicle includes a floor 20, a pair of front passenger seats 22 and 24, and a pair of similar rear passenger seats 26 and 28 placed behind the front passenger seats 22 and 24. The rear passenger seats include a seat back 50 pivotally connected to a seat bottom 52 arranged to permit the seat bottom to be pivoted between a stowed position (as best shown in FIG. 1) and a seated position (as best shown in FIG. 2). As those skilled in the art will appreciate, the subject invention is not dependent on any particular type of vehicle or seating arrangement.

Figure 4:
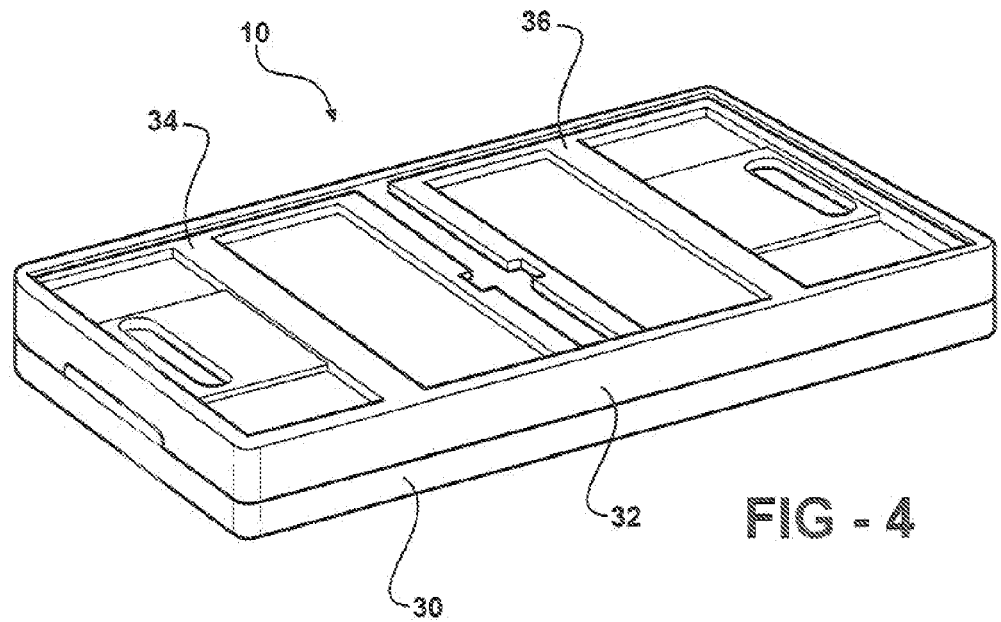
FIG. 4 is a perspective view of a collapsible storage container for a vehicle according to an exemplary embodiment of the present invention.
Figure 5:
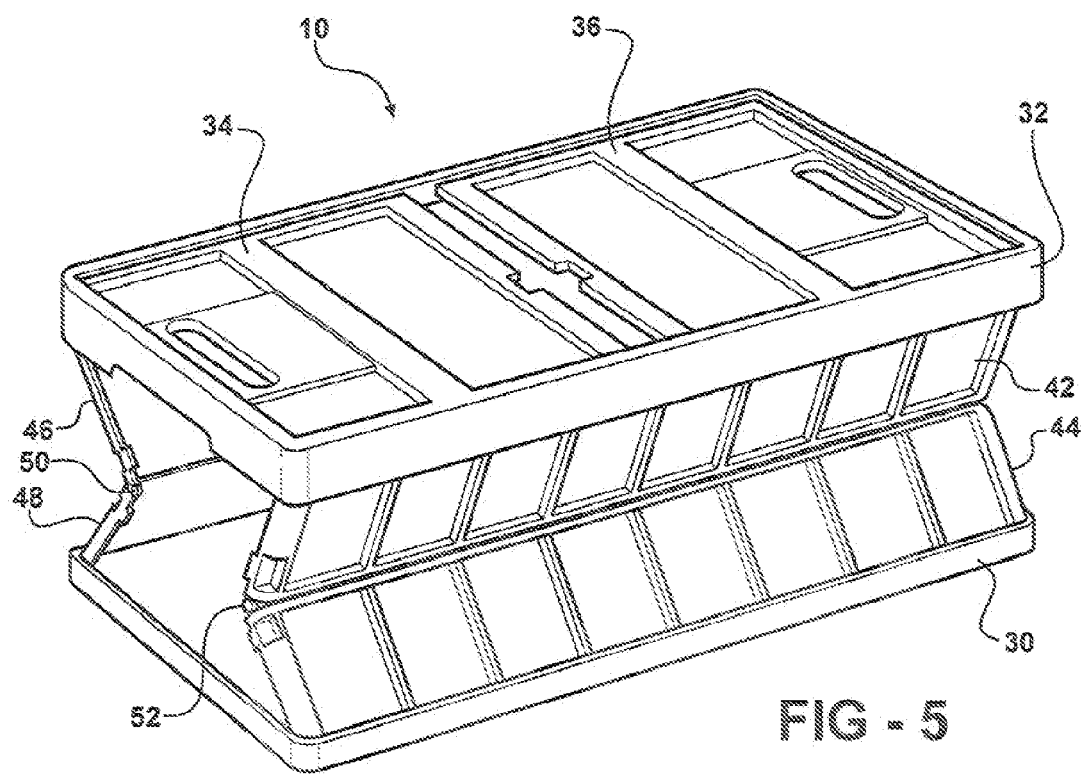
FIG. 5 is a perspective view of a collapsible storage container for a vehicle according to an exemplary embodiment of the present invention.

As shown in the exemplary embodiment of the present invention, the collapsible storage container 10 is an open top container. However, those skilled in the art will recognize that the collapsible storage container 10 may be provided with a top or lid. The collapsible storage container 10 includes a base or bottom wall 30, a top open border frame 32, two end walls 34 and 36, and two side walls 38 and 40. As best shown in FIGS. 4 and 5, each end wall 34 and 36 is formed by a single integral member, while the side walls 38 and 40 are formed by upper 42 and 46 and lower members 44 and 48 pivotally connected to each other by a pivot rod 50 and 52. Finally, the side walls 38 and 40 and end walls 34 and 36 are all pivotally connected to the top open border frame 32, with the end walls 34 and 36 additionally pivotally connected to the base or bottom wall 30.

The collapsible storage container 10 is arranged to be moved between an operative position (as shown in FIG. 1) wherein the walls of the collapsible storage container 10 are vertical and provide maximum storage space, and a collapsed position (as shown in FIG. 2) wherein the walls of the container are reduced to a fraction of their normal height. As best shown in FIG. 1, when the seat bottom 52 is in a stowed position, the collapsible storage container 10 is capable of assuming the operative position. However, as shown in FIG. 2, prior to the seat bottom 52 assuming a seated position, the collapsible storage container 10 must first be placed in its collapsed position. Likewise, the seat bottom 52 may additionally assume a seated position if the collapsible storage container 10 is first removed from the vehicle 1.

Figure 3:
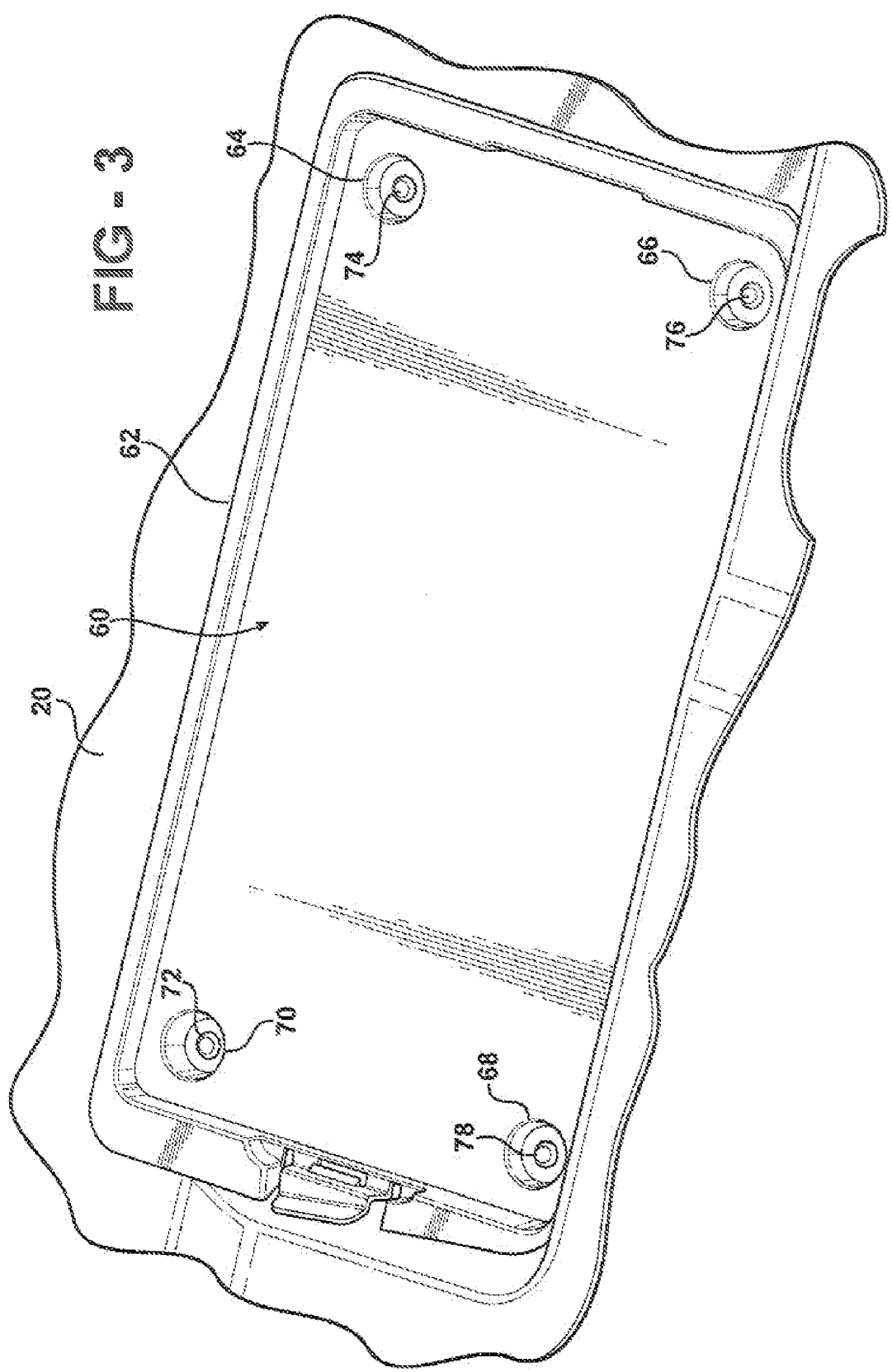
FIG. 3 is a top perspective view of a receiving mechanism for a collapsible storage container according to an exemplary embodiment of the present invention.

Similarly, as best shown in FIG. 3, a receiving and attachment mechanism 60 may be used to secure the collapsible storage container 10 to the floor 20 of the interior of the vehicle 1. According to an exemplary embodiment of the present invention, a tray 62 having an integrally formed lip protruding from up from the exterior edge of the tray may be attached the floor 20 and arranged to engage the collapsible storage container 10. The collapsible storage container 10 may be attached to the floor 20 of the vehicle 1 by a threaded fastener, for example, bolts 72, 74, 76 and 78 extending through openings 64, 66, 68 and 70 located in the bottom of the tray 62. In this manner, the collapsible storage container 10 will be secured to the floor 20 of the vehicle 1 by the integrally formed lip of the tray and prevent movement of the collapsible storage container 10 within the vehicle 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle comprising:
   a seat assembly, said seat assembly including a seat back frame pivotally coupled to a seat bottom frame;
   said seat assembly capable of being pivoted between a deployed position where said seat bottom frame is substantially perpendicular to said seat back frame and a stowed position wherein said seat bottom frame is substantially parallel to said seat back frame;
   a collapsible storage container capable of being moved from a collapsed position to an operative position, said container including an attachment mechanism; and
   a floor, said floor including a receiving mechanism located beneath said seat bottom frame in said deployed position arranged to removably secure said attachment mechanism of said container to said floor.

2. The vehicle of claim 1 wherein said receiving mechanism is a tray secured to said floor of said vehicle.

3. The vehicle of claim 2 wherein said tray includes an integrally formed lip extending upwardly from an outer edge of said tray.

4. The vehicle of claim 2 wherein a threaded fastener secures said tray to said floor of said vehicle.

5. The vehicle of claim 1 wherein said collapsible storage container further comprises:
   a bottom panel;
   a top frame;
   two opposing end walls, said end walls pivotally coupled to said top frame and arranged to pivot inwardly relative to said top frame when said container is moved into said collapsed position;
   two opposing side walls, said side walls each having upper and lower panel sections pivotally coupled to each other;
   said lower panel sections of said side walls pivotally coupled to said bottom panel;
   said upper panel sections of said side walls pivotally coupled to said top frame; and
   wherein said side walls are arranged to permit said side walls to fold inwardly relative to said top frame when said container is moved into said collapsed position.

6. The vehicle of claim 5 wherein said receiving mechanism is a tray secured to said floor of said vehicle.

7. The vehicle of claim 6 wherein said tray includes an integrally formed lip extending upwardly from an outer edge of said tray.

8. The vehicle of claim 6 wherein a threaded fastener secures said tray to said floor of said vehicle.

* * * * *